(12) United States Patent
Kohli

(10) Patent No.: US 7,203,939 B2
(45) Date of Patent: Apr. 10, 2007

(54) DENSE ALLOCATION FOR DATA STORAGE

(75) Inventor: Jaspal Kohli, Sunnyvale, CA (US)

(73) Assignee: Mirapoint, Inc., Sunnyvale, CA (US)

( * ) Notice: Subject to any disclaimer, the term of this patent is extended or adjusted under 35 U.S.C. 154(b) by 960 days.

(21) Appl. No.: 10/162,816

(22) Filed: Jun. 4, 2002

(65) Prior Publication Data

US 2003/0225967 A1    Dec. 4, 2003

(51) Int. Cl.
*G06F 9/44*    (2006.01)
*G06F 12/00*    (2006.01)

(52) U.S. Cl. .................... 717/173; 707/205

(58) Field of Classification Search ......... 707/205; 711/114, 112
See application file for complete search history.

(56) References Cited

U.S. PATENT DOCUMENTS

| | | | | |
|---|---|---|---|---|
| 6,341,342 B1* | 1/2002 | Thompson et al. | ......... | 711/166 |
| 6,354,383 B1* | 3/2002 | Muilenburg | ......... | 172/817 |
| 6,535,869 B1* | 3/2003 | Housel, III | ......... | 707/2 |
| 6,829,678 B1* | 12/2004 | Sawdon et al. | ......... | 711/114 |
| 2002/0007366 A1* | 1/2002 | Fontijn | ......... | 707/205 |

OTHER PUBLICATIONS

Wang et al., "Techniques to increase disk access locality in the Minorca multimedia file system", Proceedings of the seventh ACM international conference on Multimedia 1999 , ISBN:1-58113-239-5 , pp. 147-150.*

Ghandeharizadeh et al., "Management of disk space with REBATE", Proceedings of the third international conference on information and knowledge management, 1994 , ISBN:0-89791-674-3, pp. 304-311.*

* cited by examiner

*Primary Examiner*—Wei Zhen
*Assistant Examiner*—Philip Wang
(74) *Attorney, Agent, or Firm*—Bever, Hoffman & Harms, LLP; Jeanette S. Harms

(57) ABSTRACT

A method for increasing locality of disk references for data storage in a single file system is provided. This locality results in higher system throughput for delivery and access to the data. The data is separated into meta data and content. Both meta data and the content are densely packed in quasi-reserved sections of the disk space. The content is allocated using time based locality.

26 Claims, 5 Drawing Sheets

DENSE ALLOCATION FOR DATA STORAGE

BACKGROUND OF THE INVENTION

1. Field of Invention

The present invention relates to managing the storage of data and particularly to use of a data placement methodology and configuration that results in high throughput of data delivery and access.

2. Description of Related Art

Electronic mail (i.e. email) messages are typically stored on a disk based storage system. In one implementation to ensure redundancy of information, multiple disks can be combined using Redundant Array of Inexpensive Disks (RAID) technology to provide a logical storage device. The logical storage device is managed by a file system that provides the application (e.g. the email application) the ability to organize directories and files in a hierarchical namespace.

In one embodiment, email storage can be arranged as a hierarchy of directories that represent mailboxes. FIG. 1 illustrates an email storage hierarchy 100 that includes multiple directories. Specifically, directory 101 represents Sue's mailbox, directory 102 represents Bob's mailbox, and directory 103 represents Dan's mailbox. In hierarchy 100, the messages are stored in one or more files within these directories. For example, in directory 101, a message from Bob to Sue can be stored in file 111 and a message from Dan to Sue can be stored in file 112.

Additional information regarding the directory and its files, called meta data, can be stored as files or databases within these directories. Thus, in hierarchy 100, directory 101 includes meta data 110. Meta data can include headers (to facilitate searches of messages), states (e.g. whether a message has been read, etc.), protection information (e.g. who is designated to share the mailbox, who can read the mailbox, etc.), flags (e.g. deletion flags), and other bookkeeping information for the mailbox and its messages. The other mailbox directories can store messages and include meta data in a similar manner.

In one embodiment, the throughput of such an email storage can be measured by the number of messages per second that can be delivered and accessed by clients (such as Sue, Bob, and Dan in hierarchy 100) across a network. More specifically, the throughput has a large dependency on the functioning of the file system, i.e. the number of file system operations per second that can be performed. This in turn depends on how many inputs/outputs (I/Os) per second that can be done to the disk subsystem, wherein the subsystem could include one or more drives in a RAID system. Despite the presence of a write cache in the disk subsystem, the disk throughput for a write intensive application is ultimately dependant on the amount of seeking done on the drive.

File systems written for general-purpose systems generally have a disk space subdivided into fixed-size allocation regions. The placement policy is typically to distribute directories over the file system and place the files close to their parent directories. For example, FIG. 2A illustrates a disk space 200 in which the meta data MD1, MD2, and MD3 for directories 101, 102, and 103, respectively, are distributed in the file system. Note that the files for directory 101, i.e. files 111 and 112, are placed immediately following directory 101. In a similar manner, files 202 (shown collectively) for directory 102 can be placed immediately following directory 102 and files 203 (shown collectively) for directory 103 can also be placed immediately following director 103.

Of importance, the arrangement of directories in this manner fails to provide good locality. Specifically, as random mailboxes are addressed for delivery of or access to messages, the resulting disk access pattern is random. In other words, a disk arm in the disk subsystem would need to be moved in a random manner to write/read the meta data and/or files in the directories, thereby resulting in considerable time inefficiencies.

Some systems have attempted to address this inefficiency by spreading the load over multiple file systems. In other words, referring back to FIG. 1, each mailbox could be placed in its own file system. Thus, Sue's mailbox could be placed in one file system, Bob's mailbox could be placed in another file system, and Dan's mailbox could be placed in yet another file system. In this manner, each mailbox (i.e. directory) could be accessed in parallel. However, this configuration results in additional hardware, thereby increasing system cost. Moreover, such a configuration creates artificial constraints on the storage area, thereby causing potential management problems. For example, if Sue's mailbox is full, then additional messages for Sue cannot be written to the file systems that contain either Bob's mailbox or Dan's mailbox even if space is available in one or both mailboxes. In this case, Sue's mail delivery is "down", i.e. non-functional, until a system administrator can redistribute the disk space between the users.

Another solution to accelerate data access uses solid-state disk technology. In solid-state disk technology, memory that retains its state when power is off, e.g. flash memory, can be used to create virtual disk drives. However, this type of storage can be prohibitively expensive. Moreover, it is limited in capacity.

Yet other file systems have attempted to reduce the access time by having an "append-only" (also called a log-structured) layout. FIG. 2B illustrates a disk space 210 organized with such a file system. Specifically, both meta data and files are written in the space currently indicated by a disk arm 213, which moves in sequential order through the allocation regions. In this configuration, the meta data and files are interspersed, thereby resulting in undesirable read and write latencies in accessing the meta data. Moreover, the deletion of files leaves "holes" or empty allocation regions, which causes time inefficiencies in reading both meta data and files. These holes are typically filled in over time when disk arm 213 returns to that region. In one embodiment, a separate process is needed to perform this fill operation.

Therefore, a need arises for a method to improve the throughput of data storage within the context of a single file system without incurring additional hardware or management costs.

SUMMARY OF THE INVENTION

In accordance with one feature of the invention, densely allocating types of data to certain sections of a disk space can provide quick access to that data. The first type of data includes the actual information or content that a user sends/receives. Generally, the content doesn't change, but does occupy the bulk of the filled disk space. The second type of data includes information associated with the content, also called meta data. The meta data can change often, but occupies a relatively small portion of the filled disk space.

In one allocation or writing technique, a first quasi-reserved section can be designated for the meta data and a second quasi-reserved section can be designated for the content. Each section is "quasi-reserved" because it is preferentially used to store only one type of data. However, if space for the data is unavailable in its quasi-reserved section, then space in either section can be used.

In accordance with one feature of the invention, the content can be allocated based on the time of delivery. In other words, files in the content section can have placement in the disk space that roughly correspond to chronological order. This time-based allocation can be facilitated by an index in the file system. The index can be moved sequentially through the file system, thereby indicating the next probable region of locality for writing content in the second section.

In one embodiment, the position of the index can be modified based on certain conditions. For example, the index can be moved backwards to another allocation region if a deletion of content frees up sufficient space and that freed space is closer to the first section (for the meta data) than the current allocation region. The index can be moved forward to the next allocation region when the current allocation region is filled or close to being filled.

In accordance with one feature of the invention, determining whether a space is large enough for an allocation can be calculated using various equations. In one calculation, the free space in the allocation region (AR_free) must be larger than the average amount of free space across all allocation regions (AVG_free). In another calculation, the free space in the allocation region (AR_free) subtracted from the average amount of free space across all allocation regions (AVG_free) must be smaller than a tunable constant (MAXDIFF) used to determine how much to fill an allocation region before moving to the next allocation region. In one embodiment, the tunable constant MAXDIFF can be identical in both sections.

Meta data is typically randomly accessed for updating. The densely packed meta data, in its own quasi-reserved section, minimizes the time needed to access the meta data. Thus, the data type allocations of the invention can provide significantly higher throughput than other allocation techniques.

In contrast to meta data, content is typically accessed within a certain time period and then is accessed infrequently or deleted. For example, many employees will read their email (i.e. content) delivered during the previous night when they arrive for work the next morning. The employees can then either delete the email or save it. Thus, the dense packing of content (in its own quasi-reserved section) based on time of receipt can significantly reduce the read time associated with that content. Clearly, providing the content in substantially chronological order in the disk space can also significantly reduce the time for performing this operation. Note that moving the index to a space closer to the meta data section ensures that the bulk of the content is as close as possible to the meta data section, thereby minimizes the time spent switching between accesses/allocations of meta data and content.

A software program for allocating data in an application is also provided. The software program can include a source code segment for designating the first quasi-reserved section for the meta data, a source code segment for designating the second quasi-reserved section for immutable content, and a source code segment for allocating the meta data and the immutable content to the first and second quasi-reserved sections, respectively.

A method of storing data in at least one disk sub system is also provided. This method can include preferentially allocating the meta data to a first section and preferentially allocating the content to a second section. However, if a space is unavailable for the meta data and the content in the first and second sections, respectively, then the method can include finding the space in either the first section or the second section.

A disk space for storing data is also provided. The disk space includes a first section substantially dedicated to meta data and a second section substantially dedicated to content. The initial content in the second section is placed in chronological order.

DETAILED DESCRIPTION OF THE FIGURES

In accordance with one feature of the invention, the placement of data in a disk space, based on the type of data, can minimize write and read time of the data. For illustration purposes, the data will be described as electronic mail (email). However, other embodiments of the invention, can include other types of data such as electronic news and discussion groups, data archival/mining, and media/multimedia servers.

Data can be divided into two types. The first type of data, content, includes the actual information that a user sends/receives. The content is generally considered to be immutable or not susceptible to change. In an email system, the content occupies the bulk of the filled disk space. The second type of data, meta data, includes information associated with the content. Meta data, unlike content, can change (e.g. be updated) often. In an email system, the meta data occupies an area significantly smaller than the content.

In accordance with one feature of the invention, the placement of meta data and content into separate areas on the disk can advantageously improve locality of disk references. The locality of disk references refers to activity that can be focused proximate to a physical location in the disk space. For example, if the system is writing to the disk at location L1, then the next write would preferably be near location L1, thereby minimizing write time. Similarly, if the system is reading the disk at location L2, then the next read would preferably be near location L2, thereby minimizing read time.

Figure 1:
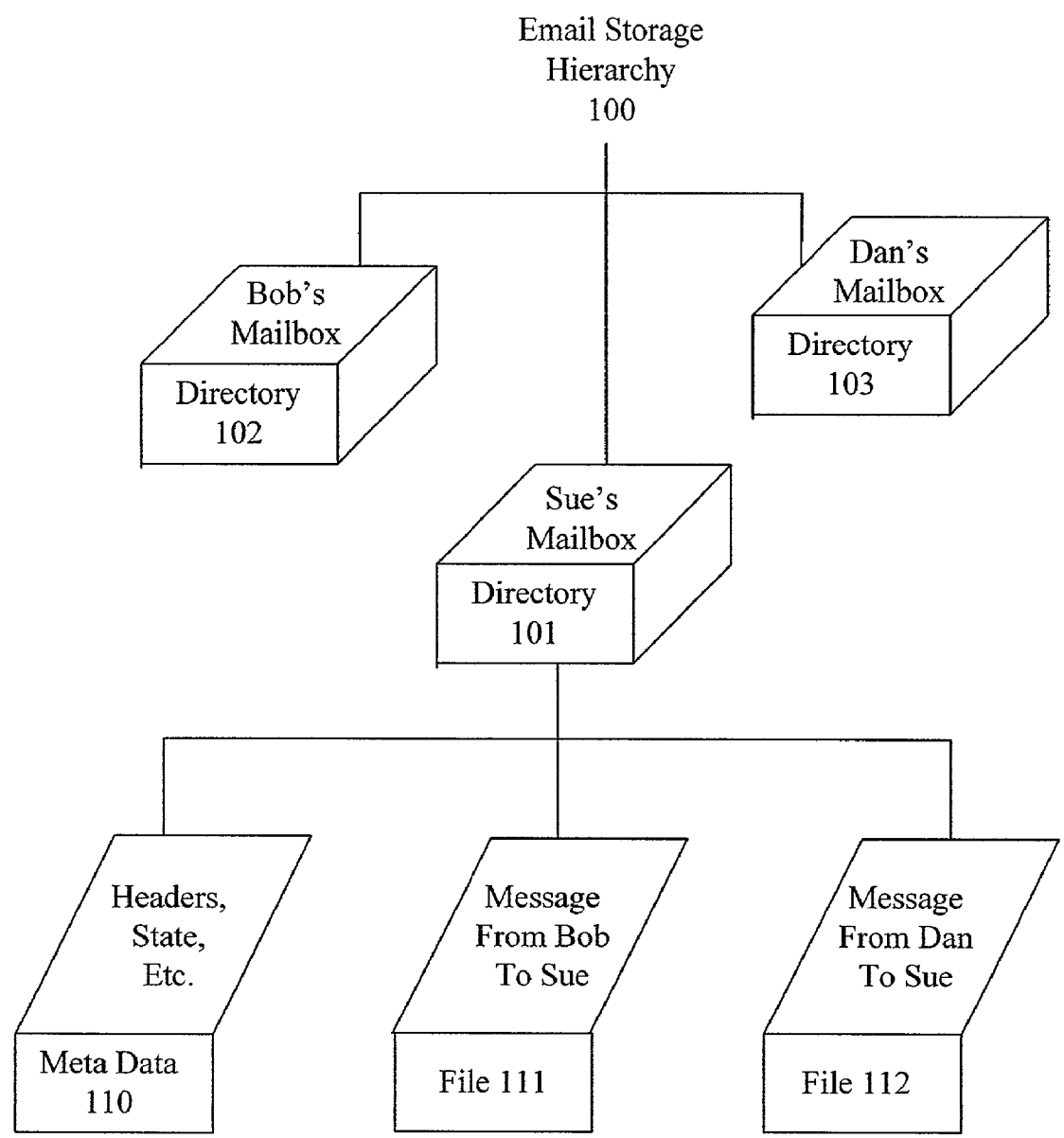
FIG. 1 illustrates a typical data storage hierarchy for email in which directories are provided at the first level nodes and files as well as meta data are provided at the second level nodes.
Figure 2A:
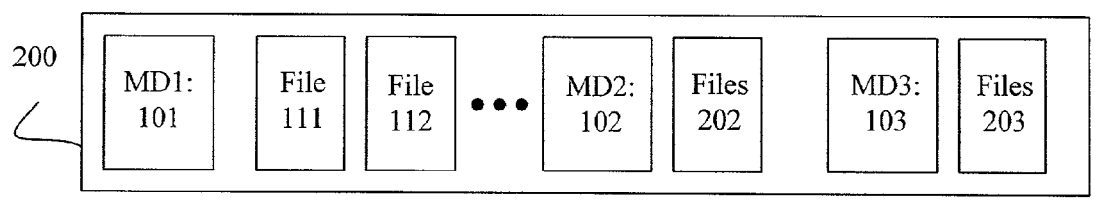
FIG. 2A illustrates a typical disk space organization for the files and meta data shown in FIG. 1.
Figure 2B:
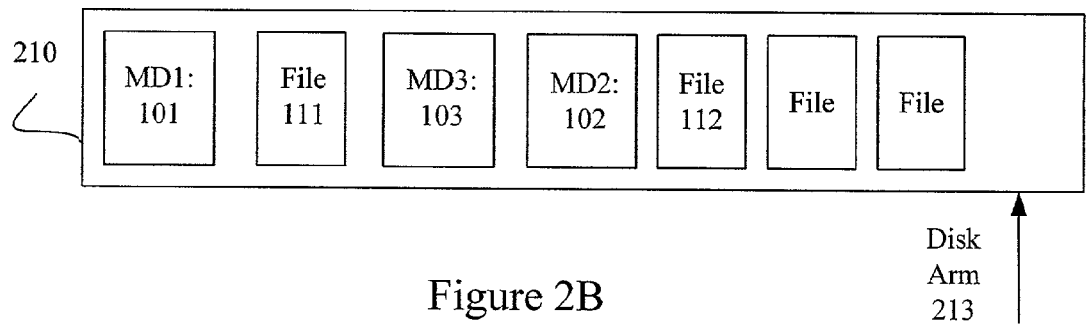
FIG. 2B illustrates another known disk space organization, wherein writing of data is based solely on chronological order.
Figure 3A:
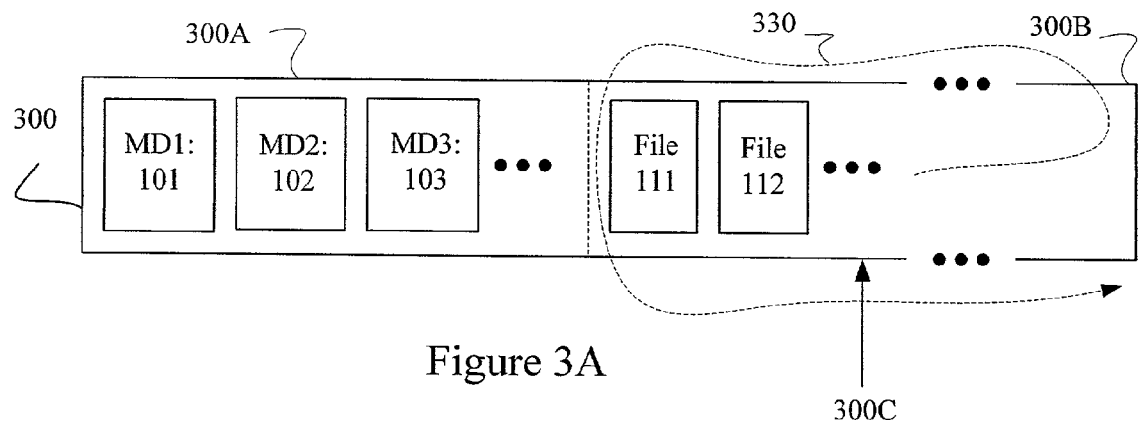
FIG. 3A illustrates a disk space organization for data, such as email, in which the meta data is preferentially separated from the content.

FIG. 3A illustrates an exemplary disk space 300 in which the meta data and content are initially placed in quasi-reserved sections. For example, in this embodiment, the meta data MD1 (associated with directory 101), the meta data MD2 (associated with directory 102), and the meta data MD3 (associated with directory 103) can be placed in a quasi-reserved meta data section 300A at the beginning of the file system. In one embodiment, the email application can inform the file system which information constitutes the meta data for the email storage.

In disk space 300, the content (such as files 111 and 112) can be placed in a quasi-reserved content section 300B, which follows section 300A and can include the remainder of the allocation regions of the file system. In accordance with one feature of the invention, the content can be allocated based on time-based locality. For example, content can be written based on the time of delivery and independent of the mailbox the content is being delivered to. Thus, file 112 was probably written to disk space 300 after file 111.

This time-based writing can be facilitated by an allocation index 300C in the file system. Allocation index 300C can be moved sequentially thru the file system, thereby indicating the next probable region of locality for writing content. For example, in FIG. 3A, allocation index 300C has been moved to the right of file 112 (assumed to be the last file written), which indicates the next probable file writing location in disk space 300.

In one embodiment, the position of allocation index 300C can be modified based on certain conditions. For example, an allocation region within section 300B may become slow to write to if it becomes very full relative to the rest of the file system. In that case, allocation index 300C can be moved forward (i.e. away from section 300A) to the next allocation region.

Moreover, a significant portion of recently delivered content may be deleted. For example, returning to the case of the emails delivered to employees during the night, a majority of such emails could be conversational and/or unsolicited, which would probably be immediately deleted by the employees. In another example, a client in a POP-based environment downloads and then deletes all of the client's content from the server. In either example, the deletion of content may result in an allocation region becoming empty relative to rest of the file system. If that allocation region is closer to section 300A than the current allocation region, then allocation index 300C can be switched to the allocation region closer to section 300A.

The dense packing of meta data in section 300A provides for a region of locality as various mailboxes are updated. Specifically, various mailboxes are randomly accessed for message delivery and retrieval. In other words, meta data typically has a random read/write access pattern. Therefore, the dense packing of meta data advantageously minimizes read/write time for random access patterns.

Note that there is a high probability that the most recently delivered (i.e. written) content using a time-based methodology will be read within substantially the same time period. For example, many employees will read their email delivered during the previous night when they arrive for work the next morning. Thus, the dense packing of content based on time of receipt can significantly reduce the read time associated with that content.

Moreover, the dense packing in section 300B can also optimize utilization of the read cache in the main memory of the host system. Specifically, the host system includes the processor as well as the memory and is connected to the disk subsystem. When a mailbox is read, the meta data can be stored in the memory, e.g. a read cache. Therefore, the user can use the read cache rather than re-access the disk space. The read cache, which is a file system level cache, works with disk blocks (not individual mailboxes). Thus, if meta data for multiple mailboxes can be placed into a disk block, then those multiple mailboxes can be stored in the read cache. Because files can be closely packed into section 300B, the read cache can be efficiently used.

Figure 3B:
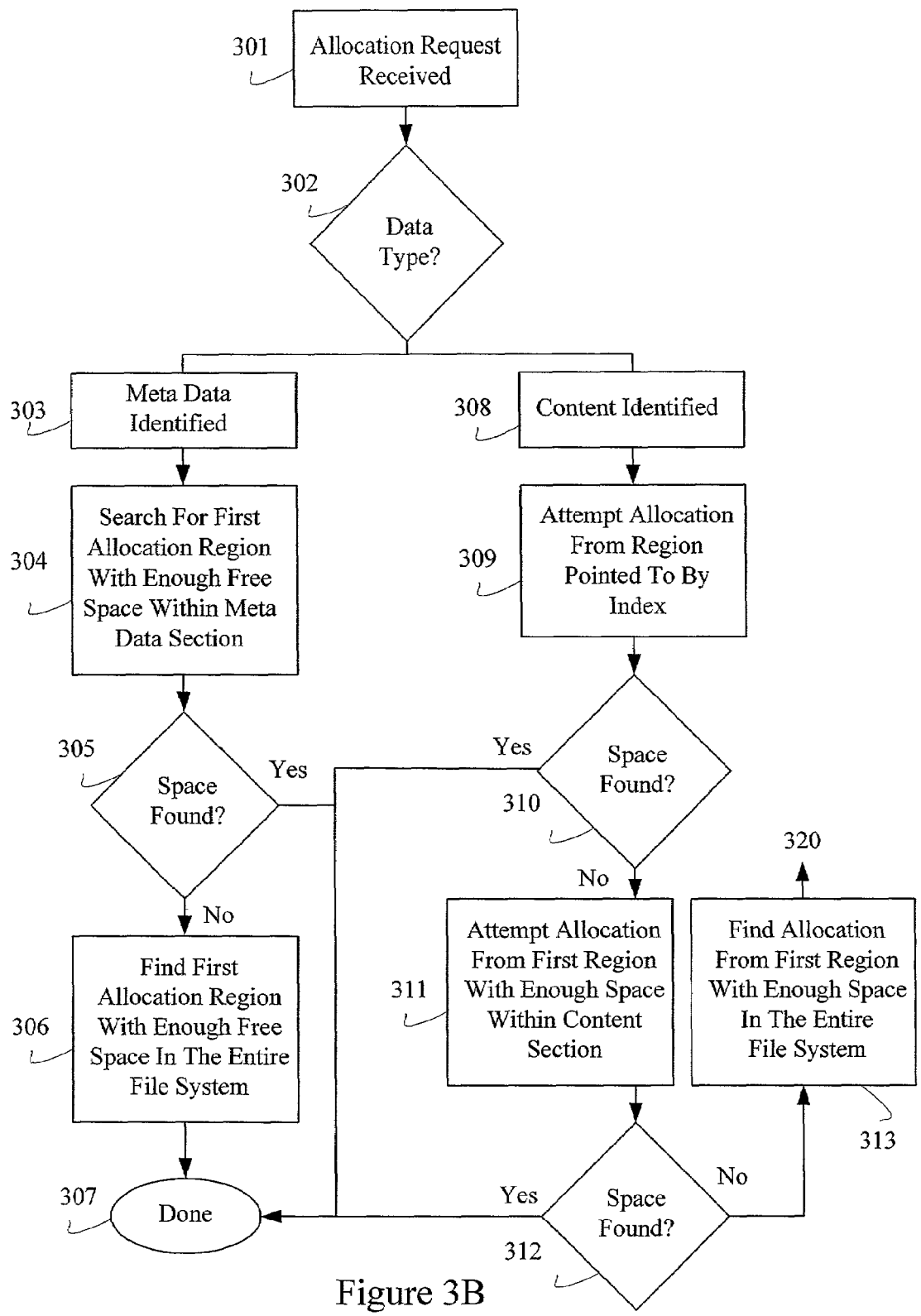
FIG. 3B illustrates a data allocation methodology for meta data and content in accordance with one embodiment of the invention.

FIG. 3B illustrates an allocation methodology in accordance with one embodiment of the invention. In step 301, an allocation request is received. In step 302, the data type of the allocation request is determined. If the data type is meta data, as identified in step 303, then step 304 searches for the first allocation region with enough free space within the quasi-reserved meta data section.

The determination of whether an allocation region has enough space can be based on the average amount of free space across all allocation regions. For example, in one embodiment, step 304 can use Equation 1 to search for the first allocation region with enough free space.

$$AR\_free > AVG\_free \qquad \text{(Equation 1)}$$

where AR_free is the free space in the allocation region and AVG_free is the average amount of free space across all allocation regions. Note that the smallest unit of allocation in the file system is termed a "block", which can be a predetermined size, e.g. 1, 2, or 4 kilobytes. Bitmaps can be used to track the allocations in the file system, i.e. determine whether blocks in each allocation region are filled or free. Thus, the average amount of free space can be computed and continuously updated to determine over- or under-utilized allocation regions in the file system.

In another embodiment, step 304 can use Equation 2 to search for the first allocation region with enough free space.

$$(AVG\_free - AR\_free) < MAXDIFF \qquad \text{(Equation 2)}$$

where MAXDIFF is a tunable constant used to determine how much to fill an allocation region before moving to the next allocation region. In one embodiment, the tunable constant MAXDIFF equals 50% of AVG_Free.

If sufficient space is not found, as determined in step 305, then the meta data can be placed in the first allocation region with enough space in the entire file system in step 306. In other words, the meta data can be placed in the section initially reserved for content. Once this space is found in the file system in step 306 or if sufficient space was found within the meta data section, then the allocation request has been successfully fulfilled and the process ends in step 307.

Returning to step 302, if the data type is content, as identified in step 308, then step 309 attempts an allocation from the region pointed to by the allocation index. Note that even if the last write was performed in the meta data section, the allocation index immediately returns to its last position within the content section. Step 310 determines whether enough free space is provided in the region pointed to by the allocation index. Once again, the determination of whether an allocation region has enough space can be based on use of either Equations 1 or 2.

If sufficient space was found in the region pointed to by the allocation index, then the allocation request has been successfully fulfilled and the process ends in step 307. However, if sufficient space is not found, then step 311 can attempt an allocation from the first region with enough space in the content section. At this point, the allocation index can be moved forward, i.e. away from the meta data section, to search for the space until the end of the file system is reached. In one embodiment, the allocation index can be returned to the beginning of the content section to continue the search through the end of the file system (see dashed arrow 330 in FIG. 3A for described search pattern). Note that deletions of content can take place in parallel with content allocations. Therefore, any space that has been freed up, even in the section previously searched, can be identified as a potential space. In another embodiment, the search can end at the original region pointed to by the allocation index.

If sufficient space is not found in the content section, as determined by step 312, then content can be placed in the first allocation region with enough space in the entire file system in step 313. In other words, the content can be placed in the section initially reserved for the meta data. At this point, the process can continue with step 320, which resets the allocation index (explained in reference to FIG. 3C).

Note that it is assumed that the file system is constructed large enough so that data can be placed in at least one region in the file system. In common practice, many email storage systems are run at 50% capacity to maintain high performance. Specifically, searching a crowded disk space takes longer than a less crowded disk space. Therefore, a conservative approach generally provides for considerable additional disk space to ensure optimal performance.

Figure 3C:
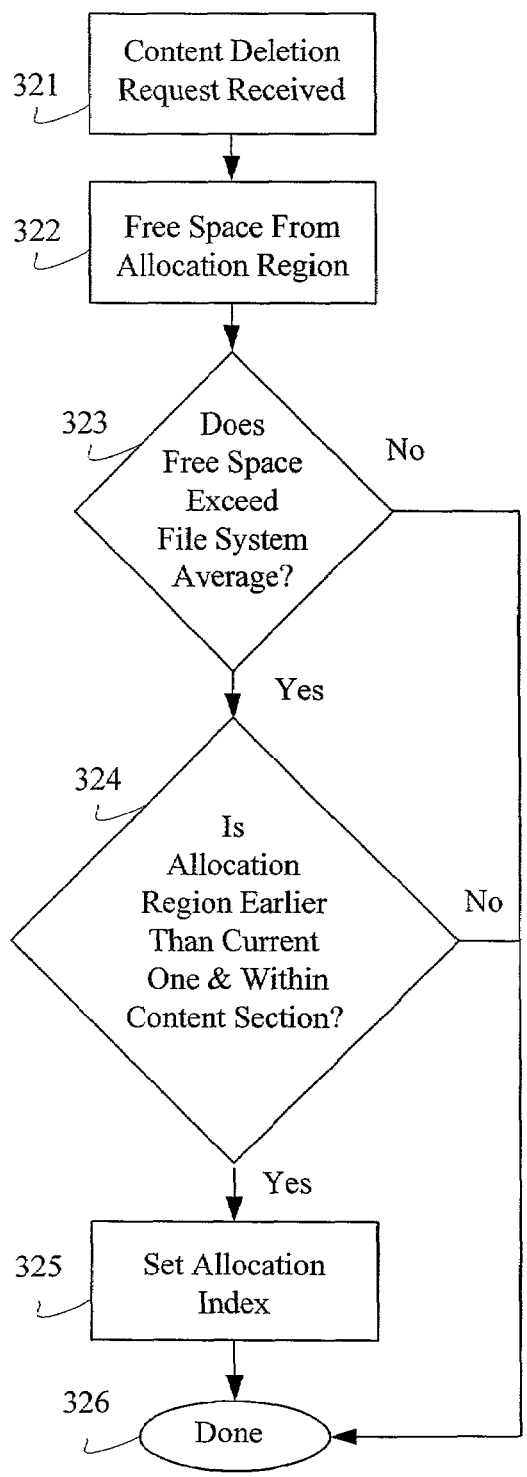
FIG. 3C illustrates a data deletion methodology in accordance with one embodiment of the invention.

FIG. 3C illustrates a content deletion methodology in accordance with one embodiment of the invention. In step 321, a content deletion request is received. In step 322, the identified content is deleted and the space in the allocation region can be freed. Step 323 determines whether that free space exceeds the file system average (i.e. AVG_free (see Equations 1 or 2)).

If that free space exceeds the file system average, then step 324 determines whether that allocation region is earlier than the current allocation region pointed to by the allocation index and within the content section. If it is earlier and within the content section, then the allocation index is moved to the recently freed space in step 325. At this point, the deletion methodology is complete in step 326. Note that if either the free space does not exceed the file system average (step 323) or the allocation region with the deleted content is later than the current allocation region (step 324), then the deletion methodology is also complete.

A method for increasing locality of disk references for storage in a single file system has been described herein. Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, some embodiments of the invention can include a computer program for allocating data in an application, wherein the data includes immutable content and meta data associated with the immutable content. The computer program can include source code segments for performing some or all of the steps described in reference to FIGS. 3B, 3C, and 4.

Figure 4:
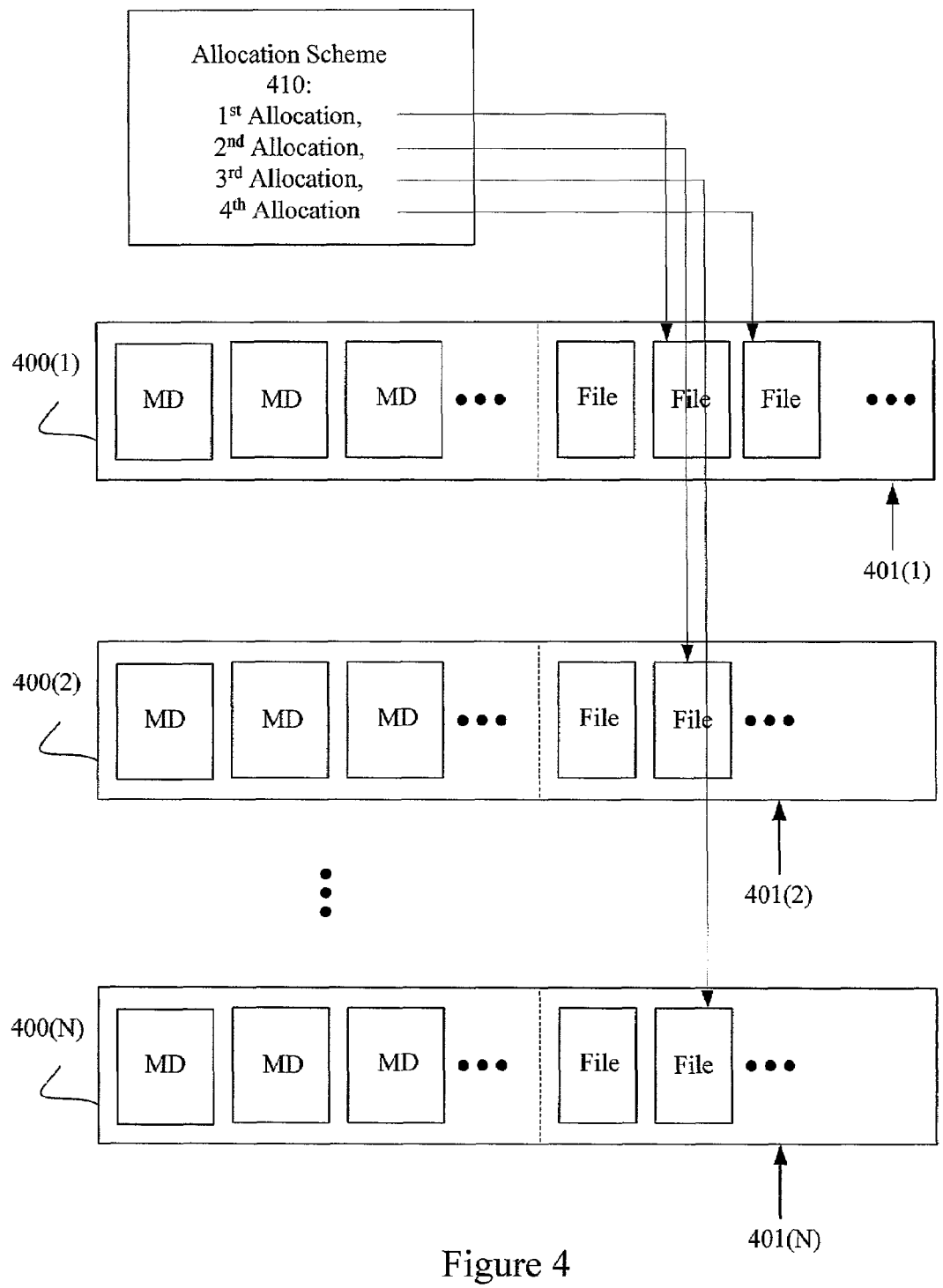
FIG. 4 illustrates a data allocation methodology using multiple disk spaces.

In one embodiment, referring to FIG. 4, the use of quasi-reserved sections for meta data and content can be applied to multiple disk subsystems. Specifically, N disk spaces 400(1)–400 (N) would have N associated allocation indexes 401(1)–401(N). At this point, a round robin allocation scheme 410 can be used. For example, assuming N=3, the first allocation can be to disk space 400(1), the second allocation can be to disk space 400(2), the third allocation can be to disk space 400(3), and the fourth allocation can return to disk space 400(1). In this manner, the user can utilize the parallel disk subsystems, thereby achieving scalability, while retaining the locality feature in each disk subsystem. Note that a single file system can be advantageously used for the multiple disk subsystems, thereby facilitating read operations. Note further that the round robin allocation algorithm is illustrative only and other allocation algorithms can also be used.

Increasing locality of reference by using quasi-reserved sections can be advantageously applied to various applications. Specifically, although an application including message storage is described in detail herein, any application including immutable content (e.g. email messages or other data which is not susceptible to (or cannot) change) and meta data associated with the immutable content can benefit from the invention. Therefore, the scope of the invention should only be limited by the appended set of claims.

The invention claimed is:

1. A method of allocating data in an application, the data including immutable content and meta data associated with the immutable content, the method comprising:
   designating a first quasi-reserved section for the meta data;
   designating a second quasi-reserved section for the immutable content; and
   allocating the meta data and the immutable content to the first and second quasi-reserved sections, respectively,
   wherein, subject to space unavailability, at least one of the first quasi-reserved section stores immutable content and the second quasi-reserved section stores meta data, and
   wherein the immutable content is allocated based on a time of delivery, thereby providing fast write and read processes in a multiple user access application.

2. A method of allocating data in an application, the data including immutable content and meta data associated with the immutable content, the method comprising:
   designating a first quasi-reserved section for the meta data;
   designating a second quasi-reserved section for the immutable content; and
   allocating the meta data and the immutable content to the first and second quasi-reserved sections, respectively,
   wherein, subject to space unavailability, at least one of the first quasi-reserved section stores immutable content and the second quasi-reserved section stores meta data,
   wherein the immutable content is allocated based on a time of delivery, thereby providing fast write and read processes in a multiple user access application, and
   wherein determining space unavailability includes determining whether free space in a quasi-reserved section is larger than an average amount of free space across that quasi-reserved section.

3. A method of allocating data in an application, the data including immutable content and meta data associated with the immutable content, the method comprising:
   designating a first quasi-reserved section for the meta data;
   designating a second quasi-reserved section for the immutable content; and
   allocating the meta data and the immutable content to the first and second quasi-reserved sections, respectively,
   wherein, subject to space unavailability, at least one of the first quasi-reserved section stores immutable content and the second quasi-reserved section stores meta data,
   wherein the immutable content is allocated based on a time of delivery, thereby providing fast write and read processes in a multiple user access application, and
   wherein determining space unavailability includes determining whether a free space in a quasi-reserved section subtracted from an average free space in that quasi-reserved section is smaller than a tunable constant.

4. The method of claim 1, wherein allocating the immutable content to the second quasi-reserved section includes attempting allocation from a first region pointed to by an index.

5. The method of claim 4, wherein the index moves to a second region in the second quasi-reserved section after allocation, wherein the second region is at a first free space after the first region.

6. The method of claim 4, further including deleting immutable content, thereby freeing space from its region.

7. The method of claim 6, wherein if the free space in the region does not exceed a computed size, then leaving the index at the first region.

8. The method of claim 6, wherein if the free space in the region exceeds a computed size, then determining whether the freed region precedes the first region and is within the second quasi-reserved section.

9. The method of claim 8, wherein if the freed region precedes the first region, then setting the index to the freed region.

10. The method of claim 9, wherein if the freed region does not precede the first region, then leaving the index at the first region.

11. A software program stored on a computer-readable storage medium and executable on a computer comprising a processor, the software program for allocating data in an application, the data including immutable content and meta data associated with the immutable content, the software program comprising:
   a source code segment for designating a first quasi-reserved section for the meta data;
   a source code segment for designating a second quasi-reserved section for the immutable content;
   a source code segment for allocating the meta data and the immutable content to the first and second quasi-reserved sections, respectively,
   wherein the software program creates the first and second quasi-reserved sections on a disk, wherein the first quasi-reserved section preferentially stores meta data and the second quasi-reserved section preferentially stores immutable content,
   wherein, subject space unavailability, at least one of the first quasi-reserved section stores immutable content and the second quasi-reserved section stores meta data,
   wherein the source code segment for allocating the immutable content the second quasi-reserved section allocates immutable content based on a time of delivery, thereby providing fast write and read processes in a multiple user access application.

12. A software program stored on a computer-readable storage medium and executable on a computer comprising a processor, the software program for allocating data in an application, the data including immutable content and meta data associated with the immutable content, the software program comprising:
   a source code segment for designating a first quasi-reserved section for the meta data;
   a source code segment for designating a second quasi-reserved section for the immutable content;
   a source code segment for allocating the meta data and the immutable content to the first and second quasi-reserved sections, respectively; and
   a source code segment for determining whether free space in a quasi-reserved section is larger than an average amount of free space across that quasi-reserved section, thereby determining space unavailability,
   wherein the software program when executed by a computer creates the first and second quasi-reserved sections on a disk, wherein the first quasi-reserved section preferentially stores meta data and the second quasi-reserved section preferentially stores immutable content,
   wherein, subject space unavailability, at least one of the first quasi-reserved section stores immutable content and the second quasi-reserved section stores meta data, and
   wherein the source code segment for allocating the immutable content the second quasi-reserved section allocates immutable content based on a time of delivery, thereby providing fast write and read processes in a multiple user access application.

13. A software program stored on a computer-readable storage medium and executable on a computer comprising a processor, the software program for allocating data in an application, the data including immutable content and meta data associated with the immutable content, the software program comprising:
   a source code segment for designating a first quasi-reserved section for the meta data;
   a source code segment for designating a second quasi-reserved section for the immutable content;
   a source code segment for allocating the meta data and the immutable content to the first and second quasi-reserved sections, respectively; and
   a source code segment for determining whether a free space in a quasi-reserved section subtracted from an average free space in that quasi-reserved section is smaller that a tunable constant, thereby determining space unavailability,
   wherein the software program when executed by a computer creates the first and second quasi-reserved sections on a disk, wherein the first quasi-reserved section preferentially stores meta data and the second quasi-reserved section preferentially stores immutable content,
   wherein, subject space unavailability, at least one of the first quasi-reserved section stores immutable content and the second quasi-reserved section stores meta data, and
   wherein the source code segment for allocating the immutable content the second quasi-reserved section allocates immutable content based on a time of delivery, thereby providing fast write and read processes in a multiple user access application.

14. The software program of claim 11, wherein the source code segment for allocating the immutable content to the second quasi-reserved section includes a source code segment for attempting allocation from a first region pointed to by an index.

15. The software program of claim 14, further including a source code segment for the moving the index to a second region in the second quasi-reserved section after allocation, wherein the second region is at a first free space after the first region.

16. The software program of claim 14, further including a source code segment for deleting immutable content, thereby freeing space from its region.

17. The software program of claim 16, further including a source code segment for leaving the index at the first region if the free space in the region does not exceed a computed size.

18. The software program of claim 16, further including a source code segment for determining whether the free space in the region precedes the first region if the free space in the region exceeds a computed size.

19. The software program of claim 18, further including a source code segment for setting the index to the free space in the region if the free space in the region precedes the first region and is within the second quasi-reserved section.

20. The software program of claim 19, further including a source code segment for leaving the index at the first region if the freed region does not precede the first region.

21. A method of storing data in at least one disk subsystem, the data including content and meta data associated with the content, the method comprising:
  preferentially allocating the meta data to a first section; and
  preferentially allocating the content to a second section,
  wherein if a space is unavailable for the meta data in the first section, then finding the space in the second section,
  wherein if a space is unavailable for the content in the second section, then finding space in the first section, and
  wherein the immutable content is allocated based on a time of delivery, thereby providing fast write processes in a multiple user access application.

22. The method of claim 21, wherein preferentially allocating the content to the second section includes attempting allocation from a first region pointed to by an index.

23. The method of claim 21, wherein if multiple disk subsystems are provided, then performing the allocations according to an allocation algorithm.

24. A disk space for storing data, the data including content and meta data associated with the content, the disk space comprising:
  a first section preferentially dedicated to meta data; and
  a second section preferentially dedicated to content,
  wherein the meta data and the immutable content are allocated to the first and second sections, respectively,
  wherein, subject to space unavailability, meta data is storable in the second section and content is storable in the first section, and wherein the immutable content is allocated based on a time of delivery, thereby providing fast write and read processes in a multiple user access application.

25. The disk space of claim 24, wherein content in the second section is placed in chronological order.

26. The disk space of claim 24, wherein the meta data in the first section is densely packed together using a first space available allocation.

* * * * *